United States Patent [19]

Zuber et al.

[11] Patent Number: 4,558,415

[45] Date of Patent: Dec. 10, 1985

[54] VEHICLE SPEED CONTROL APPARATUS AND METHOD

[75] Inventors: Pierre A. Zuber, Baldwin; Habib Dadpey, Upper St. Clair, both of Pa.

[73] Assignee: Westinghouse Electric Corp., Pittsburgh, Pa.

[21] Appl. No.: 496,693

[22] Filed: May 20, 1983

[51] Int. Cl.[4] ............... G05D 13/62; G06F 15/16; G06F 15/48

[52] U.S. Cl. ............... 364/426; 246/182 B; 246/187 B; 364/187

[58] Field of Search ............... 364/424, 426, 184, 187; 371/9, 11; 318/563, 683; 246/182 B, 182 C, 187 B

[56] References Cited

U.S. PATENT DOCUMENTS

| | | | |
|---|---|---|---|
| 3,749,994 | 7/1973 | Matty | 318/563 |
| 3,783,339 | 1/1974 | Matty | 318/683 X |
| 4,015,082 | 3/1977 | Matty et al. | 364/426 |
| 4,198,678 | 4/1980 | Maatje et al. | 364/426 |
| 4,209,828 | 6/1980 | Anderson et al. | 364/426 |
| 4,217,643 | 8/1980 | Anderson et al. | 364/426 |
| 4,270,716 | 6/1981 | Anderson | 364/426 X |
| 4,345,327 | 8/1982 | Thuy | 371/9 |
| 4,377,000 | 3/1983 | Staab | 364/187 X |
| 4,437,154 | 3/1984 | Eisele et al. | 364/187 |

Primary Examiner—Felix D. Gruber
Attorney, Agent, or Firm—R. G. Brodahl

[57] ABSTRACT

A passenger vehicle speed control apparatus operative with a track providing an input speed command having ONE and ZERO information components. Two programmed microprocessors operate through dynamic serial link apparatus for comparing a speed command signal from each information component and for comparing a speed error signal from each information component to provide a vital enablement of the vehicle propulsion motor apparatus.

9 Claims, 7 Drawing Figures

VEHICLE SPEED CONTROL APPARATUS AND METHOD

BACKGROUND OF THE INVENTION

The present invention relates to the automatic control of passenger vehicles, such as mass transit vehicles or the like, and including the decoding of wayside-provided speed codes for vehicle speed control and speed maintenance purposes while the vehicle is moving along a roadway track.

It was known in the prior art to provide a checked redundancy speed error determination as disclosed in U.S. Pat. No. 3,749,994 of T. C. Matty. It was also known in the prior art to individually decode the ones data and the zeros data of an input speed command from the roadway track, and then to compare the ones data with the zeros data to detect any discrepancy as disclosed in U.S. Pat. No. 4,015,082 of T. C. Matty et al.

Figure 4:
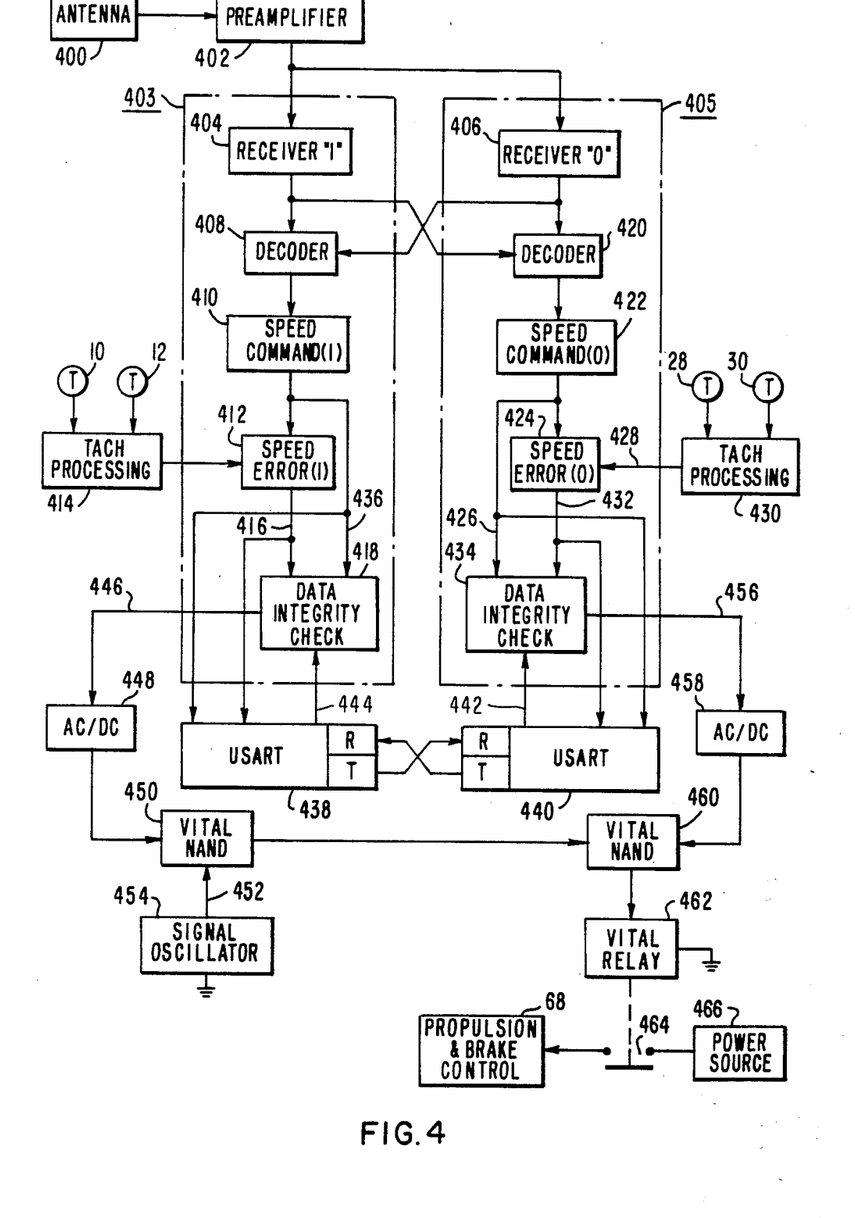
FIG. 4 shows a functional block diagram to illustrate the sequential operations of the speed control apparatus of the present invention.

A general description of the microprocessors and the related peripheral devices as shown in FIG. 4 of the drawings is provided in the Intel Component Data Catalog currently available from Intel Corporation, Santa Clara, Calif., 95051.

SUMMARY OF THE INVENTION

A more reliable and safe passenger vehicle speed control apparatus and method are provided for a vehicle operative with a track providing an input speed command including ONE and ZERO information components. Two independent programmed microprocessor channels respectively perform the speed command and speed error determination operations in relation to the ONE and ZERO information components of the input speed command. There is included a data integrity and balance check operative with a dynamic serial link apparatus to compare both of the speed command signals and both of the speed error signals for those operations, which then enables the desired speed maintaining operation and energization of the vehicle propulsion motor apparatus when the predetermined relationship integrity and balance checks are satisfied.

DESCRIPTION OF A PREFERRED EMBODIMENT

It is known to control a passenger vehicle moving along a roadway track with binary coded speed command signals received from the track, and which signals include binary logic ONE and ZERO information represented by multiple message frequencies. This information is decoded such that extraneous noise signals will not cause the vehicle to operate in an unsafe manner, such as disclosed in U.S. Pat. No. 4,015,082 of T. C. Matty et al.

Figure 1:
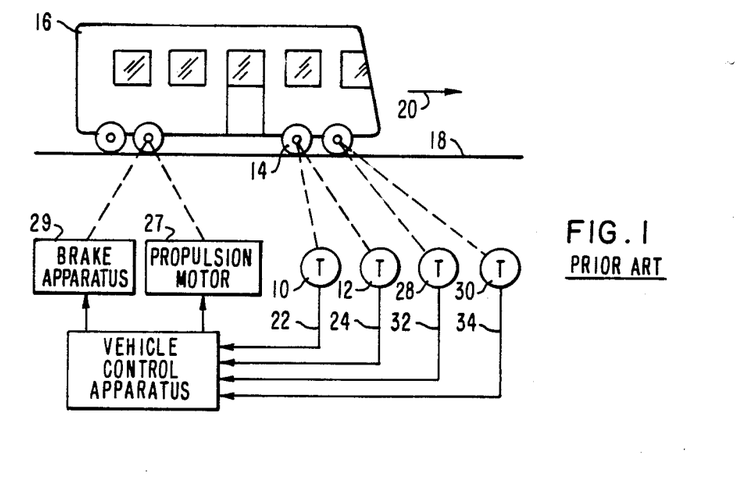
FIG. 1 shows a prior art vehicle control apparatus for a passenger vehicle.

In FIG. 1 there is shown passenger vehicle direction sensing apparatus such as disclosed in U.S. Pat. No. 3,783,339, and including first and second tachometers 10 and 12 coupled with a first axle 14 of a vehicle 16 operative with a roadway track 18. The tachometers 10 and 12 are aligned relative to one another in a predetermined relationship such that if the vehicle is traveling in a forward direction as indicated by arrow 20, an output 22 signal is provided from the tachometer 10 which is displaced in a first phase relationship with the output signal 24 from the tachometer 12. In the event the vehicle 16 is in a rollback condition and is traveling in a reverse direction that is opposite to the directin of arrow 20, the output signals appearing at the leads 22 and 24 are displaced from one another in a different and second phase relationship. In this way, the vehicle control apparatus 26 can provide a desired operation of the propulsion motor 27 or the brake 29 in response to the determined movement direction of the vehicle 16 by the relative phase displacement relationship of the signals 22 and 24. Similarly, the tachometers 28 and 30 provide output signals 32 and 34 which have a first phase relationship when the vehicle is moving forward in the direction of the arrow 20 and a second and different phase relationship when the vehicle 16 is moving in the reverse direction.

Figure 2:
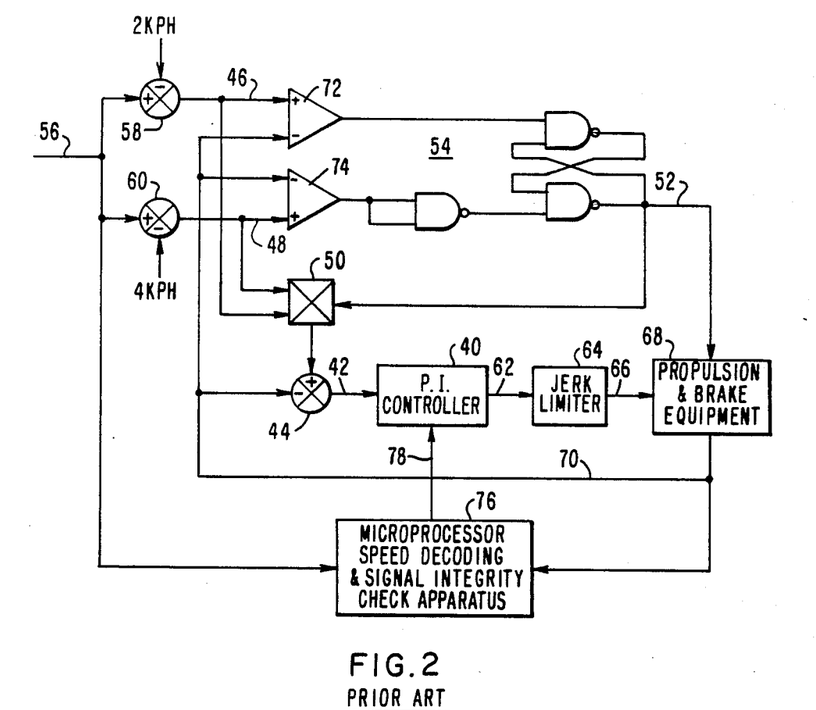
FIG. 2 shows a prior art speed decoding and signal integrity check apparatus operative to enable the effort request signal generator in a vehicle speed maintaining control apparatus.

In FIG. 2 there is provided a functional schematic of a prior art speed decoding and signal integrity check apparatus operative to enable the effort request signal generator in a vehicle speed maintaining control apparatus, such as disclosed in U.S. Pat. 4,217,643 of L. W. Anderson et al. A proportional plus integral controller 40 responds to a speed error signal 42 from a comparator 44 responsive to a speed feedback signal 70 and one of a brake reference velocity signal 46 or a power reference velocity signal 48, through operation of a selector 50 that responds to the brake mode or the power mode output control signal 52 of a power and brake controller 54. An input speed command signal 56 is supplied to a first comparator 58 to provide the brake reference velocity signal 46 that is 2 KPH below the value of the speed command signal 56, and is operative with a comparator 60 to provide the power reference velocity signal 48 that is 4 KPH below the speed command signal 56.

The PI controller 40 provides an output first effort request P signal 62 to a jerk limiter 64, which provides an output second effort request P signal 66 to the propulsion and brake equipment 68 of a transit vehicle. The output signal 52 from the power and brake controller 54 is either a brake mode control signal having a zero value or a power mode control signal having a one value. The actual speed 70 of the vehicle is fed back as an input to the power and brake controller 54. When the actual speed 70 is above the brake reference velocity signal 46, the comparator 72 causes the power and brake controller 54 to provide the brake mode control signal 52 to the propulsion and brake equipment 68. When the actual speed signal 70 is less than the power reference velocity signal 48, the comparator 74 causes the power and brake controller 54 to provide the power mode control signal to the propulsion and brake equipment 68.

The programmed microprocessor speed decoding and signal integrity check apparatus 76 is in accordance with the disclosure of U.S. Pat. No. 4,209,828 of L. W. Anderson et al., the disclosure of which is incorporated herein by reference, and which responds to the input speed command signal 56 for comparison with the vehicle actual speed signal 70 to provide an enable signal 78 to the PI controller 40 to enable the provision of the effort request signal 62 when the zeros data speed error signal, determined in accordance with the zeros data of the input speed command 56, is substantially the same as the ones data speed error signal.

Figure 3:
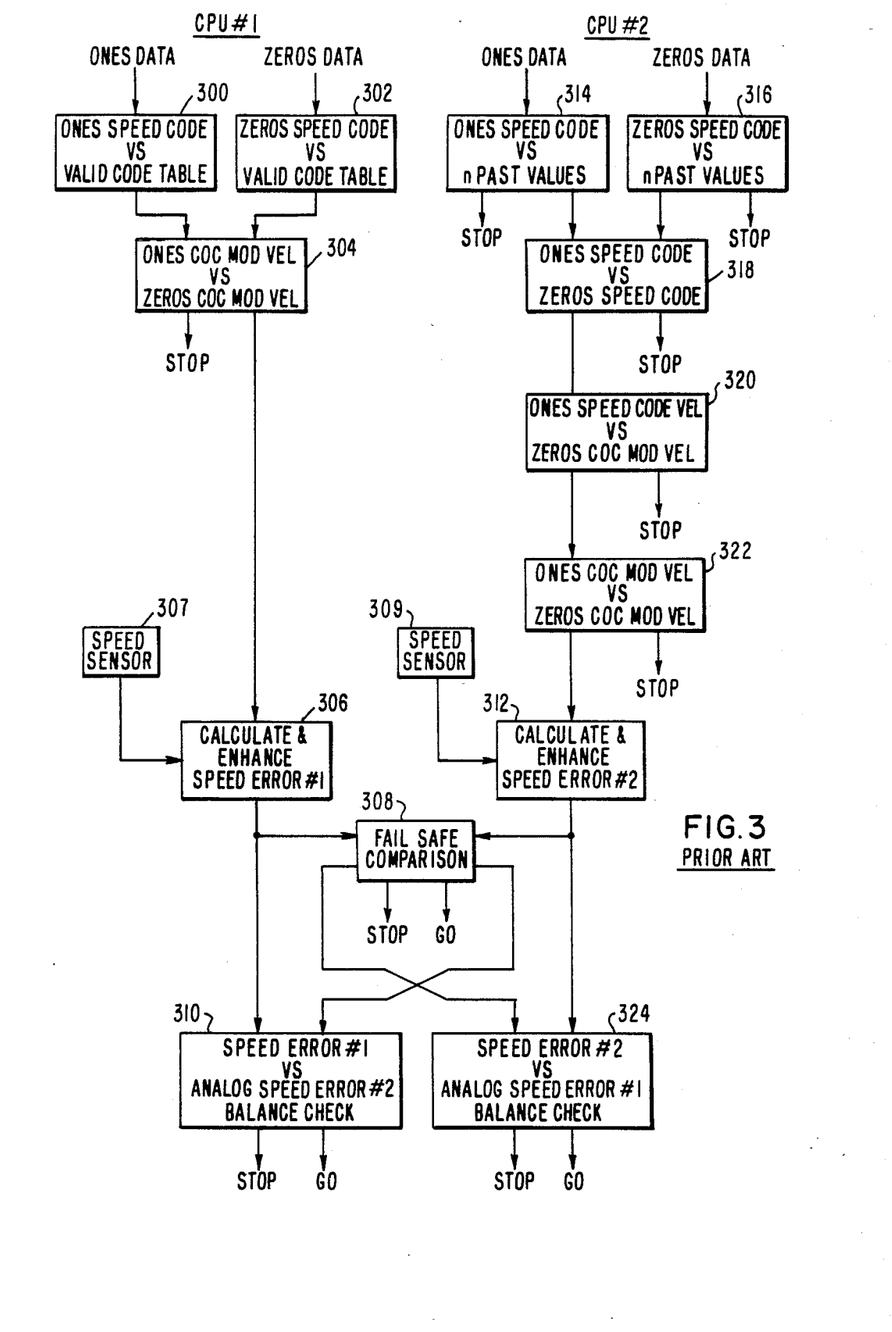
FIG. 3 shows a flow chart of the prior art control program operative with the control apparatus of FIG. 2.

In FIG. 3, there is shown a flow chart of the control program operative with the microprocessor speed decoding and signal integrity check apparatus 76 shown in FIG. 2. FIG. 3 shows the successive and different comparisons that are made in the speed decoding and speed error determining program routine. At block 300, the ones data in the input speed command is compared in a first microprocessor CPU #1 against a table of valid speed codes. At block 302, the zeros data in the input speed command is compared with a table of valid speed codes. Block 304 compares the decoded speed from the ones data with the decoded speed from the zeros data. If these values are the same, at block 306 the vehicle speed error is determined in relation to the vehicle actual speed from the first speed sensor 307. Similarly, for the second microprocessor CPU #2, at block 314 the ones data from the input speed command is compared bit by bit to a given number of past values of the ones speed code. Block 316 compares the zeros data of the input speed command bit by bit with past values of the zeros speed code. Block 318 compares the 6-bit ones speed code with the 6-bit zeros speed code. Block 320 compares the ones speed code velocity to the corresponding zeros speed code velocity, which velocity is obtained from look-up tables. At block 322, the ones cutout car modified velocity is compared with the zeros cutout car modified velocity. Block 312 determines the speed error in relation to the vehicle actual speed from the second speed sensor 309. At block 308 a fail-safe hardware comparison is provided between the determined speed error from the first microprocessor and output from the block 306 with the determined speed error from the second microprocessor and output from block 312. Block 308 is a vital checking logic apparatus in a form of hardware fail-safe logic for checking the respective speed errors from the first microprocessor and the second microprocessor. On the same hardware module with this fail-safe comparison, each speed error is converted to an analog signal and sent to the opposite computer such that the speed error from the first microprocessor and output from the block 306 is converted at block 308 into an analog speed error and sent to the block 324 for comparison with the speed error from the second microprocessor and output from the block 312. Similarly, the speed error from the second microprocessor and output from the block 312 is converted by the fail-safe comparison hardware 308 into an analog signal that is sent to the block 310 for comparison with the first microprocessor speed error output from the block 306. At block 310, the digital speed error calculated for CPU1 in block 306 is compared to the analog speed error calculated for CPU2 in block 312. Block 324 compares the digital speed error from the second microprocessor and output from the block 312 with the analog speed error from the first microprocessor and output from the block 306 passing through the fail-safe comparison 308. A comparison failure at any one of the blocks shown in FIG. 3 operates to stop the vehicle. In addition, the block 308 provides an overspeed and balance check and the blocks 310 and 324 provide balance checks to establish that the error balance is within a given tolerance in relation to both of the speed errors from the first microprocessor and the second microprocessor.

In FIG. 4 there is shown a functional block diagram to illustrate the sequential operations of the speed control apparatus of the present invention. The vehicle carried antenna 400 senses the input speed command signal from the roadway track, and the signal strength is increased in a preamplifier 402. The signal then passes to a first microprocessor channel 403 including a receiver 404 tuned to the ones data component of the input speed command signal and to a second microprocessor channel 405 including a receiver 406 tuned to the zeros data component of the input speed command signal. A decoder 408 within the first microprocessor channel 403 operates to provide the speed command 436 at block 410 in relation to the zeros data from the receiver 406 and the ones data from the receiver 404. A speed error determination apparatus 412 compares the speed command for the ones data with the vehicle speed from the tachometers 10 and 12 which pass through a well-known tachometer processing apparatus 414 to provide the vehicle speed to the speed error determination apparatus 412. The speed error 416 and the speed command 436 are supplied to a data integrity check apparatus 418 for the ones data microprocessor channel 403.

The zeros data signal from the receiver 406 and the ones data signal from the receiver 404 operate with the decoder 420 to provide the zeros speed command 426 at block 422. A zeros speed error determining apparatus 424 compares the speed command 426 with the vehicle speed 428 from a tachometer processing apparatus 430 operative with the tachometers 28 and 30 such as shown in FIG. 1. The speed error signal 432 and the speed command 426 are supplied to a data integrity check apparatus 434 for the zeros data microprocessor channel 405.

The ones speed command signal 436 and the ones speed error 416 are supplied to a well-known USART apparatus 438 operative with the ones microprocessor channel 403, and which can be an Intel 8251A Programmable communication interface apparatus which operates as a dynamic serial data link to transmit each of the ones speed command 436 and the ones speed error 416 to a similar USART communication interface 440 operative with the zeros data microprocessor channel 405. The ones speed error 416 and ones speed command signal 436 are supplied through output 442 to the data integrity check apparatus 434 of the zeros microprocessor channel 405. Similarly, the zeros speed command 426 and the zeros speed error 432 are transmitted by the USART 440 to the USART 438 and are provided through output 444 to the data integrity check apparatus 418 for the ones microprocessor channel 403. This programmable communication interface serial link apparatus can include an Intel 8251A programmable data communication apparatus and related equipment, such as is described in the Intel Component Data Catalog from the Intel Corporation, Santa Clara, Calif., 95051. It takes a finite time for this serial transmission to occur, so a balance timer delay of about 250 milliseconds is provided for the operation of the data integrity checks 418 and 434.

After the balance time delay, if the ones speed command 436 and the zeros speed command 426 in data integrity check 418 compare and are substantially the same, and if the ones speed error 416 and the zeros speed error 432 in the data integrity check apparatus 418 compare within a predetermined difference such as 5 KPH, then an output toggle signal 446 having a predetermined frequency, such as 9 hertz, is supplied through an AC to DC converter 448 to enable a vital NAND circuit 450 to pass a predetermined control signal 452 from a signal generator 454. This control signal 452 can have a predetermined frequency such as 159 hertz modulated by 109 hertz. Similarly, after the balance time delay, if the zeros speed command 426 compares and is substantially the same as the ones speed command in the data integrity check 434 and if the zeros speed error 432 compares within a predetermined difference such as 5 KPH with the ones speed error 416 in the data integrity check 434, then an output toggle signal 456 having a predetermined frequency such as 9 hertz, is provided through an AC to DC converter 458 to enable a vital NAND circuit 460 to pass the signal 452 from the signal oscillator 454. If each of the vital NANDS 450 and 460 are enabled in this manner to pass the signal 452, this will energize the vital relay 462 including a relay driver to close a contact 464 for energizing the propulsion and brake control 68 from the power source 466.

Figure 5:
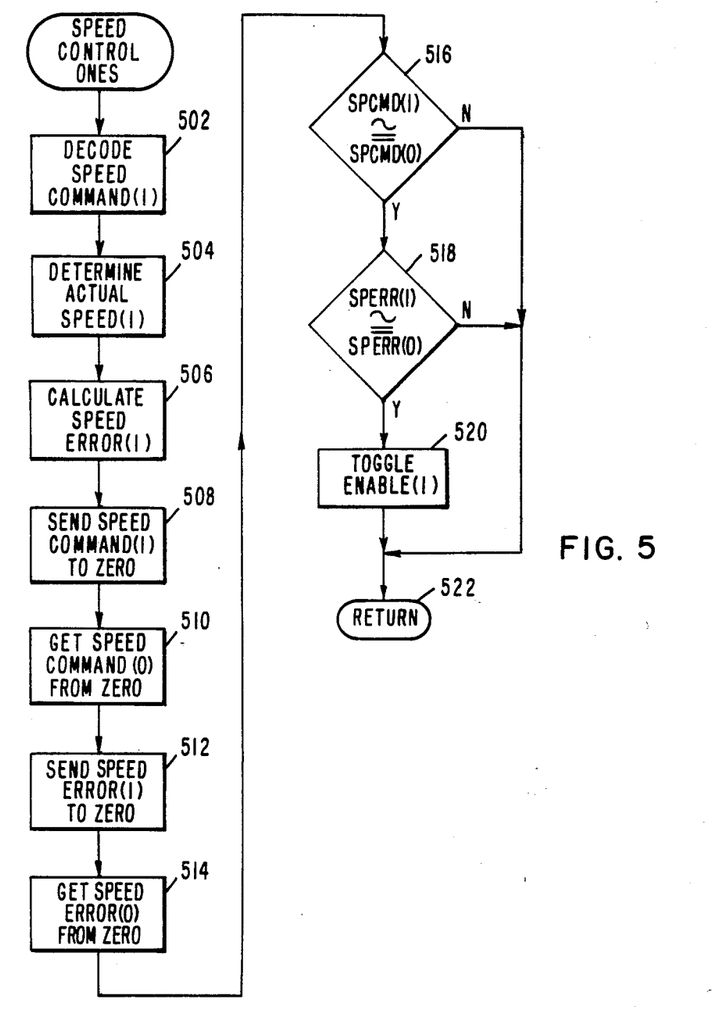
FIG. 5 shows a flow chart to illustrate the ones speed code data decoding and integrity check program of the present invention.

In FIG. 5 there is shown a program flow chart for the ones microprocessor channel 403 to decode the ones speed code data and perform an integrity check and balance operation in accordance with the present invention. The speed control ones routine, when called, decodes the ones speed command at step 502. At step 504 there is determined the ones actual speed. At step 506 the ones speed error is calculated. At step 508 the ones speed command is sent to the zeros channel. At step 510 the zeros speed command is obtained from the zeros channel. At step 512 the ones speed error is sent to the zeros channel and at step 514 the zeros speed error is obtained from the zeros channel. At step 516 the ones speed command is compared to see if it is substantially equal to the zeros speed command. At step 518 a comparison is made to see if the ones speed error is within a predetermined difference with the zeros speed error. If each of the comparisons at steps 516 and 518 are satisified and yes, the ones toggle enable signal is provided at step 520, and if either is not, the program terminates at the return step 522.

Figure 6:
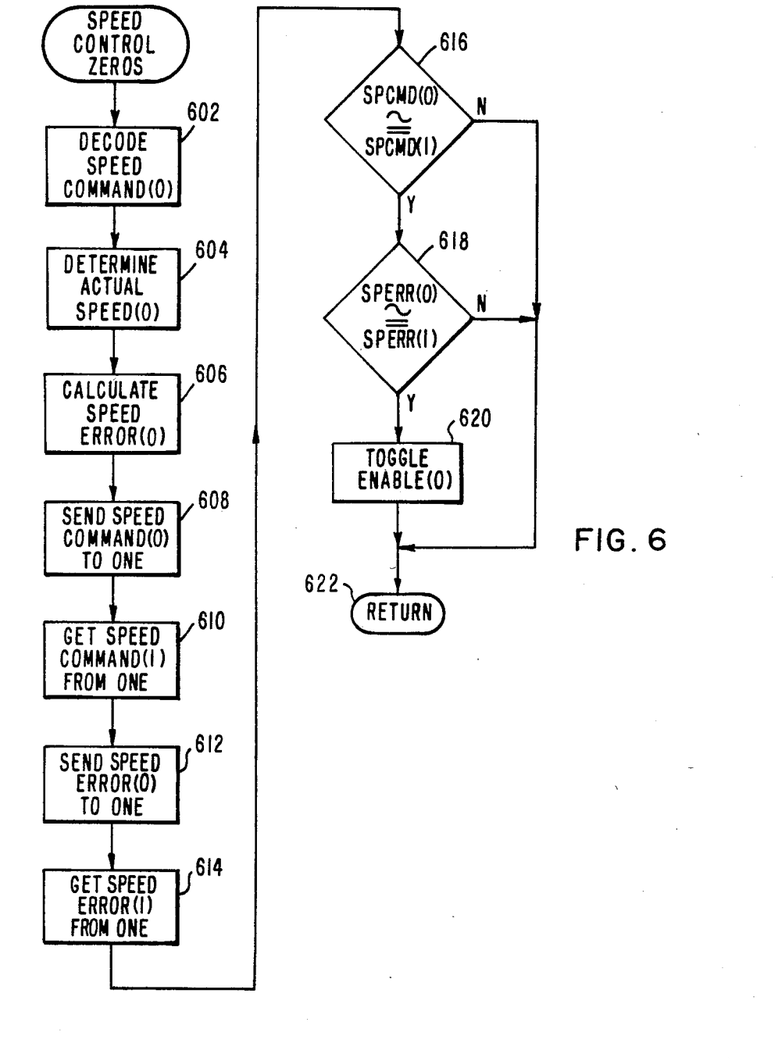
FIG. 6 shows a flow chart to illustrate the zeros speed code data decoding and integrity check program of the present invention.

In FIG. 6 there is shown a flow chart for the zeros microprocessor channel 405 to decode the zeros speed code data and perform the integrity check and balance operation in accordance with the present invention. At step 602 the zeros speed command is decoded. At step 604 the zeros actual speed is determined. At step 606 the zeros speed error is calculated. At step 608 the zeros speed command is sent to the ones channel. At step 610 the ones speed command is obtained from the ones channel. At step 612 the zeros speed error is sent to the ones channel, and at step 614 the ones speed error is obtained from the ones channel. At step 616 a comparison is made to see if the zeros speed command is substantially equal to the ones speed command. If not, the program terminates. At step 618 a comparison is made to see if the zeros speed error is within a predetermined difference with the ones speed error. If not, the program terminates, and if yes, at step 620 the zeros toggle enable signal is provided.

Figure 7:
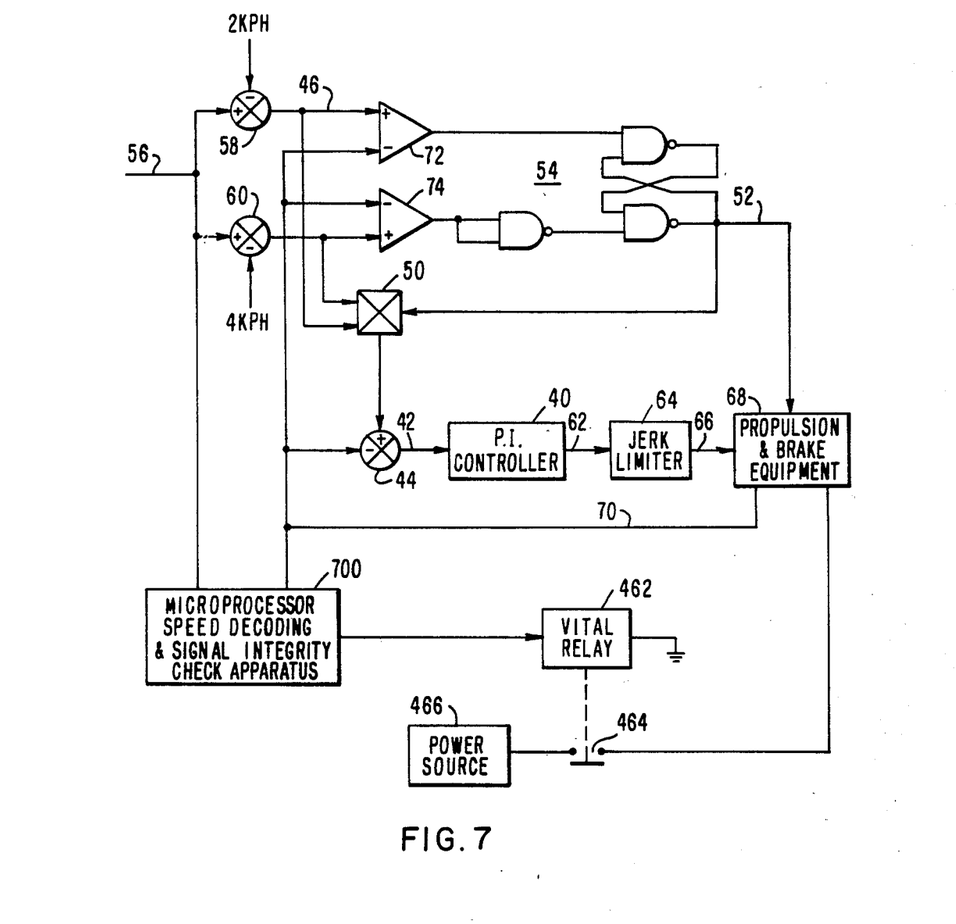
FIG. 7 shows the operation of the present speed decoding and signal integrity check apparatus with a vehicle speed maintaining apparatus.

In FIG. 7 there is functionally shown the present speed decoding and signal integrity and balance check apparatus applied to control a vehicle speed maintaining apparatus. The speed decoding and signal integrity check apparatus 700 operates in accordance with the descriptions of FIGS. 4, 5 and 6. The vital relay 462 is shown in FIG. 4 as is the contact 464 controlling the energization of the propulsion and brake equipment 68 by the power source 466.

In automatic train speed control, system safety is of vital importance. The present invention improves system safety by using the disclosed speed signal channel redundancy operation in association with vital circuits. It is desired to provide a vehicle speed measurement and to determine the amount of speed error in relation to the commanded speed. In order to achieve the desired vehicle speed control vitality, two independent speed control operations determine the speed command and the speed error of the vehicle and compare these through the use of a vital balance and overspeed detector arrangement. A universal asynchronous receiver transmitter or USART apparatus accepts data characters from each CPU operation in parallel format and converts those data characters into a continuous and dynamic serial data stream for transmission to the other microprocessor channel. The serial data stream is received and converted into parallel data characters for use by the other microprocessor. In order to improve safety and reliability, two independent USART equipments are used to transfer data between the two microprocessor-based operations. Each CPU operation computes the speed of the vehicle using two independent sents of tachometers, and once the speed of the vehicle is known, the speed error or difference between the actual speed and the commanded speed can be determined. This speed error is then sent to the other microprocessor module through the dynamic high speed USART serial link.

We claim:

1. In apparatus for controlling the speed of a vehicle having a propulsion motor and moving along a track providing to the vehicle an input speed command having first and second information components, the combination of:

means responsive to the actual speed of the vehicle along said track;

first means responsive to the first information component to provide a first speed command;

second means responsive to the second information component to provide a second speed command;

means including a dynamic serial link for providing the first speed command to the second means and for providing the second speed command to the first means;

said first means establishing a predetermined relationship between the first speed command and the second speed command to provide a first output signal to control the energization of the propulsion motor when said predetermined relationship is present between the first and second speed commands; and said second means establishing a predetermined relationship between the second speed command and the first speed commond to provide a second output signal to control the energization of the propulsion motor when said predetermined relationship is present between the second and first speed commands.

2. The speed control apparatus of claim 1, including:
said first means providing a first speed error in relation to the first speed command and said actual speed;
said second means providing a second speed error in relation to the second speed command and said actual speed;
said serial link means providing the first speed error to the second means and providing the second speed error to the first means;
said first means establishing a second predetermined relationship between the first speed error with the second speed error to determine the provision of the first output signal; and
said second means establishing said second predetermined relationship between the second speed error with the first speed error to determine the provision of the second output signal.

3. The speed control apparatus of claim 1, including:
vital logic means responsive to the respective first and second output signals to enable the energization of the propulsion motor when each of the first and second output signals are provided.

4. The speed control apparatus of claim 1,
with the respective predetermined relationships established by the first and second means between the first and second speed commands being substantially equal.

5. The speed control apparatus of claim 2,
with the predetermined relationships between the respective first and second speed commands being substantially equal; and
with the predetermined relationships between the respective first and second speed errors being within a predetermined difference.

6. The method of controlling a vehicle having a propulsion motor and moving along a track providing to the vehicle a desired speed signal having first and second information components, including the steps of:
determining the actual speed of the vehicle;
providing a first speed command in a first information component channel;
providing a second speed command in a second information component channel;
sending the first speed command dynamically to the second information component channel for comparison with the second speed command to provide a first output signal when a predetermined relationship is established between the first and second speed commands;
sending the second speed command dynamically to the first information channel for comparison with the first speed command to provide a second output signal when said predetermined relationship is established between the first and second speed commands; and
controlling the operation of said propulsion motor in response to the first and second output signals.

7. The vehicle control method of claim 6, including the steps of:
providing a first speed error in said first channel in relation to the actual speed;
providing a second speed error in said second channel in relation to the actual speed;
sending the first speed error dynamically to the second channel for comparison with the second speed error to determine the provision of the first output signal in accordance with a second predetermined relationship between the first and second speed errors; and
sending the second speed error dynamically to the first channel for comparison with the first speed error to determine the provision of the second output signal in accordance with said second predetermined relationship between the first and second speed errors.

8. The vehicle control method of claim 6,
with the predetermined relationship for the comparison of the first and second speed commands being substantially equal.

9. The vehicle control method of claim 7,
with the predetermined relationship for the comparison of the first and second speed commands being substantially equal; and
with the predetermined relationship for the comparison of the first and second speed errors being within a predetermined difference.

* * * * *